(12) United States Patent
Allegrezza et al.

(10) Patent No.: US 7,895,519 B1
(45) Date of Patent: Feb. 22, 2011

(54) TRACKING USE OF INTERFACE AND ONLINE ASSISTANCE

(75) Inventors: George N. Allegrezza, Worcester, MA (US); Stephen J. Todd, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 816 days.

(21) Appl. No.: 11/904,889

(22) Filed: Sep. 28, 2007

(51) Int. Cl.
G06F 3/00 (2006.01)

(52) U.S. Cl. ........................................ 715/708; 715/705

(58) Field of Classification Search ................. 715/708, 715/705
See application file for complete search history.

(56) References Cited

U.S. PATENT DOCUMENTS

| | | | | |
|---|---|---|---|---|
| 5,086,393 A * | 2/1992 | Kerr et al. ................... 702/186 |
| 5,757,904 A * | 5/1998 | Anderson .............. 379/265.06 |
| 5,774,118 A * | 6/1998 | Hatakama ................... 715/707 |
| 5,861,884 A * | 1/1999 | Fujioka ....................... 715/705 |
| 5,949,415 A * | 9/1999 | Lin et al. .................... 715/740 |
| 6,047,261 A * | 4/2000 | Siefert ......................... 705/11 |
| 6,064,381 A * | 5/2000 | Harel .......................... 715/705 |
| 6,298,457 B1 * | 10/2001 | Rachlin et al. ............... 714/49 |
| 6,340,977 B1 * | 1/2002 | Lui et al. .................... 715/709 |
| 6,564,220 B1 * | 5/2003 | Huber et al. ..................... 1/1 |
| 6,574,615 B1 * | 6/2003 | Huber et al. ..................... 1/1 |
| 6,871,322 B2 * | 3/2005 | Gusler et al. ............... 715/708 |
| 7,194,685 B2 * | 3/2007 | Morrison .................... 715/705 |
| 7,228,329 B2 * | 6/2007 | Kaiser ........................ 709/203 |
| 7,526,722 B2 * | 4/2009 | Wadhwa ..................... 715/707 |
| 2001/0033294 A1 * | 10/2001 | Asch et al. .................. 345/705 |
| 2007/0192700 A1 * | 8/2007 | Sengar ....................... 715/733 |

* cited by examiner

*Primary Examiner* — Tadeese Hailu
*Assistant Examiner* — Nicholas S Ulrich
(74) *Attorney, Agent, or Firm* — Krishnendu Gupta; Jason A. Reyes; Phillip W. Citroen (57) ABSTRACT

A method is used in tracking use of interface and online assistance. A first set of a user's user interface activity is tracked. The user's online assistance activity subsequent to the user's user interface activity is tracked. A second set of the user's user interface activity is tracked. The second set occurs subsequent to the user's online assistance activity. A description of the first and second sets of the user's user interface activity and the user's online assistance activity are recorded together.

18 Claims, 8 Drawing Sheets

| DATE | TIME | COMPONENT | SUB_COMPONENT | MESSAGE |
|---|---|---|---|---|
| Aug 6 | 15:33:33 | CEM | UIServices: | /cem/exchange/provisionProvisionOracle?tablespace=400 |
| Aug 6 | 15:33:34 | CEM | ExchangeProvider: | Provision Oracle tablespace=400 |
| Aug 6 | 15:33:34 | CEM | CapacityProvider: | Get Available Space capacity |
| Aug 6 | 15:33:34 | CEM | CelerraAdapter: | Get capacity, pool="Oracle" |
| Aug 6 | 15:33:34 | NAS | NASAdmin: | error="Unknown Pool Oracle" |
| Aug 6 | 15:33:34 | CEM | CelerraAdapter: | CreateNewPool, name="Oracle", size=1GB |
| Aug 6 | 15:33:35 | NAS | NASAdmin: | error="No available capacity" |
| Aug 6 | 15:33:35 | CEM | UIServices: | error="No available capacity" |
| Aug 6 | 15:40:12 | HELP | HelpSystem: | GET /cem/help/main_screen |
| Aug 6 | 15:40:32 | HELP | HelpSystem: | GET /cem/help/disk_capacity |
| Aug 6 | 15:40:38 | HELP | HelpSystem: | GET /cem/help/disk_capacity/disk_usage_report |
| Aug 6 | 15:41:02 | CEM | UIServices: | GET /cem/applications/list_all |
| Aug 6 | 15:41:10 | CEM | UIServices: | GET /cem/applications/exchange_summary |

FIG. 8

TRACKING USE OF INTERFACE AND ONLINE ASSISTANCE

BACKGROUND

1. Technical Field

This application generally relates to tracking use of interface and online assistance.

2. Description of Related Art

During the course of using a computer, a user may make mistakes in entering commands or have questions about how to accomplish a particular function or goal. Various levels of on-line help systems have been provided to assist users.

A very simple level is one in which the system, in response to the entry of an erroneous command, outputs an error code or a short message. The user's response depends upon the user's knowledge which varies greatly dependent upon the user's training and experience with using computers. An experienced person usually would know the proper response, upon receiving an error message, but even experts often need help. A less experienced person would have to look up the answer in a manual or ask a more knowledgeable person what to do. Some computers are provided with on-line help systems in which full text or shortened descriptions of system commands can be accessed by a user pressing a help key.

Such descriptions may or may not be helpful dependent upon the user's expertise and ability through trial-and-error methods to choose the right option. Such descriptions are general in nature and are not tailored to the specifics of the user's activity.

In the past, various "intelligent" help systems have been proposed at least some of which incorporate concepts, techniques and tools from the field of artificial intelligence.

In using a software application or the like on a computer or the like, a user is often able to avail himself or herself of a help function built into or attached to the application. Such help function can be quite thorough and even exhaustive, and may contain a number of help topics or the like that can be accessed by way of an index of key words, a table of contents, or a search phrase, among other things.

Importantly, a user searching for one or more particular help topics needs to have at least a rough idea of the key words, contents section, or search phrase to employ to find such help topics. The user can be led astray by a bad choice, or may at times not even have any notion of where to start. Finding an appropriate help topic can become a challenging exercise.

In at least some applications and some instances with regard to such applications, a particular portion or activity of the application may be linked directly to one or more help topics of the help function, where the linked-to pre-defined help topics presumably correspond to the particular portion. Accordingly, a user working at the particular portion of the application can merely actuate the link and immediately be directed to the pre-defined presumably corresponding help topics. For example, if the activity is saving a file worked on by the user with the application, a saving transaction may provide a help switch that when actuated by a user transfers such user to various 'save file' help topics.

In the aforementioned circumstance, the help function may be said to be activity-sensitive in that the help topics presented to the user are based on and relevant to the current activity of the application.

Thus, computer-aided help system have been developed to provide on-line assistance to computer users, and more advanced help systems display context-sensitive help. Context-sensitive help systems determine what particular part of an application program the user is in. Then help information is displayed that is relevant to this user location.

Such context-sensitive help systems represent an advancement over simple help systems, and have numerous characteristics. Such systems are usually tightly coupled to an application program; they rely on the application program to keep track of and store the context. Since these systems are configured to display help information based upon program location, they return the same help information for a given location regardless of how the user got there. Such systems provide the convenience of on-line help in that the help information they provide is effectively a user's manual correlated with a given program screen or function.

A storage system is a configurable computer system that provides storage service relating to the organization of information on writable persistent storage devices, such as memories, tapes or disks. The storage system is commonly deployed within a storage area network (SAN) or a network attached storage (NAS) environment.

A system administrator makes important data storage configuration decisions such as decisions as to the number of disks and the locations of portions (extents) of those disks that are aggregated to construct "user-defined volumes" and, thereafter, how those volumes are used. The term "volume" as conventionally used in a SAN environment implies a storage entity that is constructed by specifying physical disks and extents within those disks via operations that combine those extents/disks into a user-defined volume storage entity.

Typically, the system administrator renders his or her decisions through a complex user interface oriented towards users that are knowledgeable about the underlying physical aspects of the system. For example, the user interface may revolve primarily around physical disk structures and management that the system administrator must manipulate in order to present a view of the SAN platform on behalf of a client. In some instances, the user interface may prompt the administrator to specify the physical disks, along with the sizes of extents within those disks, needed to construct the user-defined volume. In addition, the interface may prompt the administrator for the physical locations of those extents and disks, as well as the manner in which they are "glued together" (organized) and made visible (exported) to a SAN client as a user-defined volume corresponding to a disk or logical volume (LUN). The system administrator may also need to specify the form of reliability, e.g., a Redundant Array of Independent (or Inexpensive) Disks (RAID) protection level and/or mirroring, for that constructed volume. RAID groups are then overlaid on top of those selected disks/extents.

In sum, a data storage system administrator is typically required to finely configure the system, including in at least some cases the physical layout of the disks and their organization to create a user-defined volume that is exported as a single LUN to a SAN client. For the system administrator to increase the size of the user-defined volume, disks are added and RAID calculations are re-computed to include redundant information associated with data stored on the disks constituting the volume.

Thus, conventional user interface systems for SAN and NAS storage environments require large amounts of administrator intervention to manage the disks, volumes and/or file systems involved. Additionally, any user interface differences between SAN and NAS environments may force the system administrator to manage multiple sets of commands to configure and control the file systems, disks and/or volumes contained within the storage system environment.

The environment may include data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Different tasks may be performed in connection with a data storage system. For example, a customer may perform data storage configuration tasks (i.e., serve as his or her own system administrator). Such tasks may include, for example, configuring storage for use with an email application. In connection with the configuration processing, tasks may include allocating storage, specifying the logical and/or physical devices used for the storage allocation, specifying whether the data should be replicated, the particular RAID level, and the like. With such options in connection with performing the configuration, a customer may not have the appropriate level of sophistication and knowledge needed.

SUMMARY OF THE INVENTION

A method is used in tracking use of interface and online assistance. A first set of a user's user interface activity is tracked. The user's online assistance activity subsequent to the user's user interface activity is tracked. A second set of the user's user interface activity is tracked. The second set occurs subsequent to the user's online assistance activity. A description of the first and second sets of the user's user interface activity and the user's online assistance activity are recorded together.

One or more implementations of the invention may provide one or more of the following advantages.

In a situation in which a user is having a problem, a history that includes both the user's user interface activity and the user's online assistance activity in sequence can be provided to aid in understanding where the user started and then where the user ended up based on the online assistance activity.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Described below is a technique for use in tracking use of interface and online assistance. In at least some implementations, the technique enables a system whereby a user's path through a software user interface and online user assistance is tracked as follows:

1) User's specific actions, including time expended.
2) User requests for online user assistance (e.g., online help), when encountering problems in step (1).
3) User's actions, including time expended, after leaving online user assistance in step (2).

A purpose is to establish a mechanism in which a user's ability to navigate through user interface is tracked, including the points at which the user seeks online user assistance through online help. Once the user leaves online help, his or her actions are again tracked. A benefit is that this helps identify elements of the user interface or online user assistance that are not easily understood by novice users and would be improved in subsequent releases.

In particular, the technique allows integration of tracking of both the user assistance and the user interface itself. In at least some cases, the correlation between the two is critical to understanding the user experience and identifying difficult navigational or usability problems for further analysis and revision.

For example, storage system setup can be complex, involving storage system concepts such as logical volumes (LUNs), RAID types, stripe sizes, mapping, masking, caching, host adapter configurations, and file system configurations. Typical users of inexpensive data storage systems such as small office or home office (SOHO) systems are not storage savvy, and without excellent ease of use and automated help features as described below, such users may require expensive human assistance to set up and maintain such systems.

Figure 1:
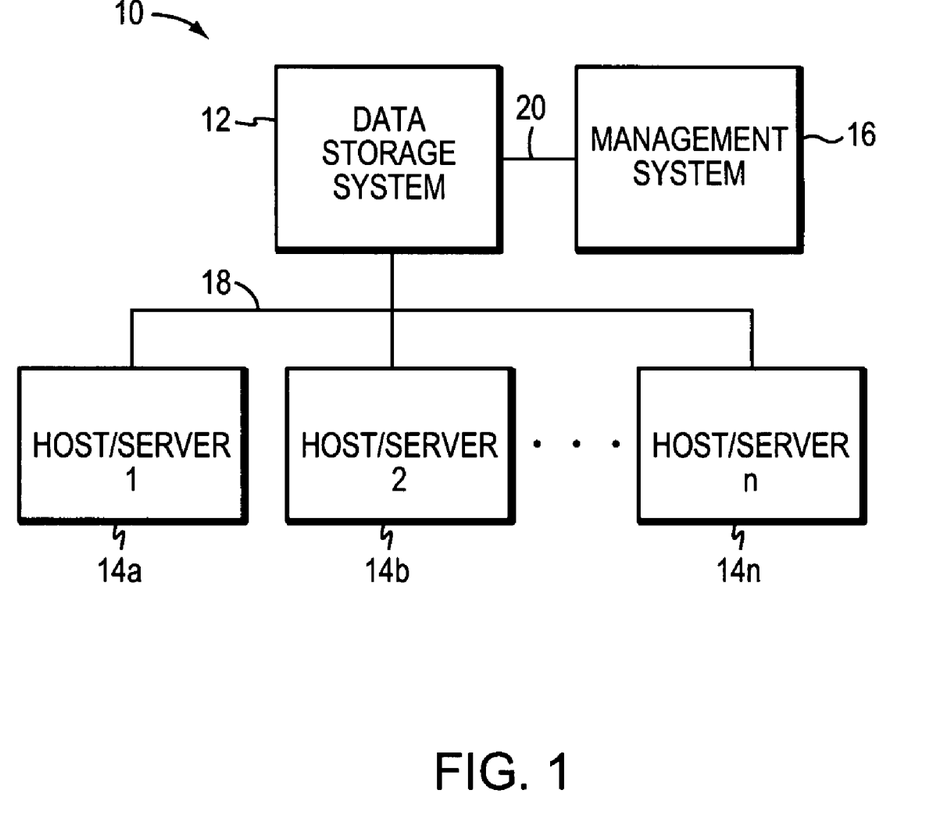
FIG. 1 is an example of an embodiment of a computer system that may utilize the techniques described herein.

Referring to FIG. 1, shown is an example of an embodiment of a computer system that may be used in connection with performing the technique described herein. The computer system 10 includes one or more data storage systems 12 connected to server or host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the one or more data storage systems 12 of FIG. 1 may be an appliance with hardware and software for hosting the data storage of the one or more applications executing on the hosts 14a-14n. The appliance may include one or more storage processors and one or more devices upon which data is stored. The appliance may include software used in connection with storing the data of the hosts on the appliance and also software used in connection with configuring the data storage for use by the hosts in connection with technique described herein. As an example in connection with an email application server component that may executed on the hosts 14a-14n, the data storage configuration tasks may include allocating storage for user accounts or mailboxes, specifying the devices (logical and/or physical) used to store the email data, specifying whether data replication is performed for disaster recovery, and the like. In another example, in connection with a database application server component that may executed on the hosts 14a-14n, the data storage configuration tasks may include allocating storage for database data, specifying the devices (logical and/or physical) used to store the database data, specifying whether data replication is performed for disaster recovery, and the like. Features that may be used in connection with performing data storage configuration and configuration tasks may be included in order to provide ease of use to customers of the data storage system(s) 12.

In connection with an embodiment in which the data storage 12 is an appliance including hardware and software, the appliance may also include other software for performing different data services. For example, the appliance may include backup server software which interacts with software on the hosts 14a-14n when performing a backup operation.

In another embodiment, the data storage systems 12 may include one or more data storage systems such as one or more of the data storage systems offered by EMC Corporation of Hopkinton, Mass. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for providing the features as described herein for processing a data storage configuration request.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

In following paragraphs, reference may be made to a particular embodiment such as, for example, an embodiment in which element 12 of FIG. 1 is an appliance as described above. However, it will be appreciated by those skilled in the art that this is for purposes of illustration and should not be construed as a limitation of the features described herein.

Features may be included to assist customers of a data storage system in connection with performing data storage services such as related to data storage system configuration, provisioning of data storage, and the like. Such features are adaptable to the particular knowledge level of the user. The features are flexible and allow for implementation of best practices and defaults in an automated fashion which are customized for the particular application, user or customer, and/or underlying data storage system and environment to meet specific customer needs. Depending on the level at which a user interacts with the data storage system, different levels or amounts of automation of the best practices may be performed. The user may elect to bypass the automation of best practices or limit the amount of automation performed by interacting with the system at various levels.

Figure 2:
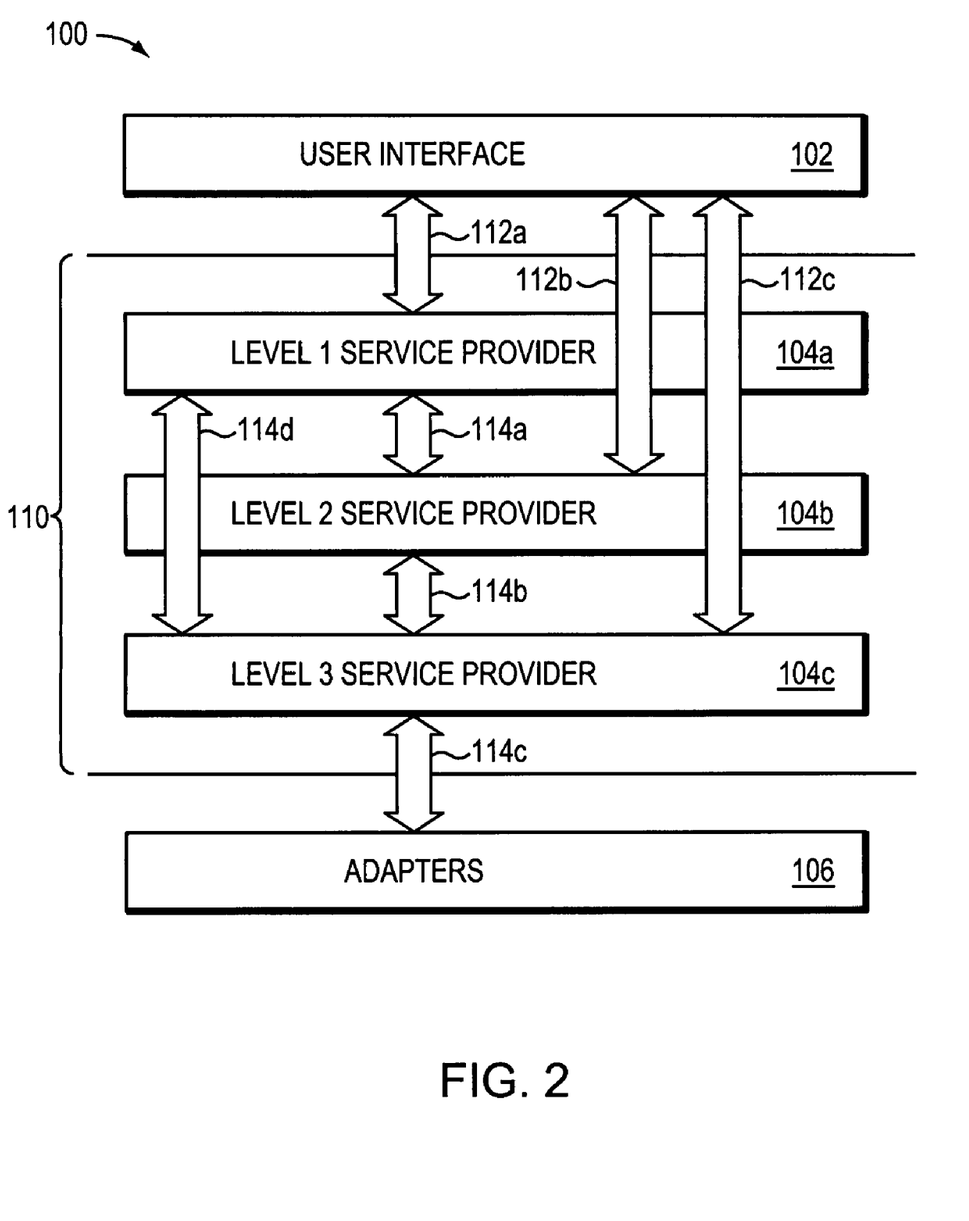
FIGS. 2 and 3 are examples of components that may be included on the data storage system for use in performing the techniques herein.

Referring to FIG. 2, shown is an example representation of components that may be included on the data storage system 12 for use in providing features described herein for data storage configuration. The example 100 includes a user interface 102, one or more levels of service providers 110, and adapters 106. In the example 100, the element 110 includes 3 service provider layers or levels 104a-104c. It should be noted that although 3 service provider levels are shown in FIG. 2, an embodiment may include any number of service provider levels.

The adapters 106 are used in connection with facilitating communications between the service providers, such as the level 3 service provider 104c, and other components. The different service providers included in the example 100 may be able to communicate directly with one another. However, when one of the service providers at one of the levels communicates with another component other than one of the service providers, an adapter may be utilized. An adapter may be characterized as a layer of software between one of the service providers, such as service provider 104c, and another component, such as a lower-level component invoked to implement data storage platform specific functionality. An adapter 106 may convert a service provider API to the API of another component. As an example, the service provider 104c may perform a call to an external component to create a file system. An adapter 106 may be used as an intervening layer between 104c and the external component in which the adapter 106 converts the API call from 104c to the API of the external component. The conversion may include, for example, mapping parameters between the API calls, performing multiple calls to the external component for the one API call from 104c, and the like. It should be noted that an adapter 106 may not utilized if such conversion is not needed.

The user interface (UI) 102 provides for one or more different types of user interfaces and associated data. For example, the UI 102 may provide support for a graphical user interface (GUI), command line interface (CLI), and the like, to support interactions between the data storage system 12 and the hosts 14a-14n of FIG. 1. Each of the different service provider levels of 110 may provide a different logical view and level of abstraction with respect to a data storage configuration task to be performed for an application executing on one of the hosts. In connection with the features described herein, a user may interact through the UI 102 with any one of the different levels of service providers 104a-104c when performing data storage configuration requests. Each of the service providers of 110 may provide a different level of detail or abstraction with respect to the underlying operations and tasks performed on the data storage system in accordance with different levels of user sophistication and knowledge. The language or terminology, UI data (e.g., content or data used to populate the UI menus), and UI presentation or structure (e.g., commands presented or particular hierarchical menu structure) may vary in accordance with the particular level of service provider selected by the user. Thus, a user may interact with the data storage system at a variety of different levels when issuing data storage configuration requests for the same application. The UI may be customized for the particular level and application for which the request is performed.

In an embodiment, the UI 102 may be characterized as a set of different user interfaces that may vary depending on the target user and associated user level at which the user interacts with the system. Each level may provide a different user interface for a different level of user interaction and level of knowledge and sophistication. Each level may also be associated with a different level of automation of the best practices, for example, with users interacting at level 1 obtaining the greatest amount of automation of best practices and users interacting at level 3 obtaining none or minimal amount of automation. The UI 102 may provide multiple different user interfaces in accordance with the different levels allowing a user the option of connecting and interacting with the data storage system at any level. By allowing a user to select a level of interaction and automation, such features provide a user with a flexible approach to choose deeper levels and entry points (e.g., level 3) providing less automation and more detail as well as selection of other levels (e.g., level 1) when greater automation of best practices is desirable.

For example, level 1 service provider 104a may provide a beginner or most simplistic view of the data storage system and tasks performed for data storage configuration. Interaction with the level 1 service provider 104a requires the least amount of knowledge and may be geared toward interacting with users having minimal knowledge when performing a data storage configuration request by providing the greatest level of abstraction of the underlying system and operations performed. The language may be more non-technical in comparison to the interface language of other levels. As the level increases, so does the assumed level of knowledge of the user in connection with interactions. Level 3 service provider in the example 100 may be utilized by the most knowledgeable users providing a greatest granularity of control of all levels in connection with a data configuration request. Level 3 exposes more detailed information to the user than interactions at levels 1 and 2. As an example, a level 1 user may issue a data storage configuration request to provision storage for a number of mailboxes for storing data of an email application executing on one of the hosts. The level 1 user may specify a minimal amount of information in connection with the request such as only a number of mailboxes. A user may interface with the data storage system using a GUI and issue the data storage configuration request. The language and terminology of user interactions via the GUI may be customized for the level 1 user of the email application. In connection with the same email application, a more knowledgeable user may choose to issue a data storage configuration request via a GUI for a same number of mailboxes by interacting with level 3 service 104c. At level 3, the user provides more detailed information about the request regarding the underlying data storage device and how this data storage device is used by the application. To further illustrate, the level 3 data storage configuration request may specify the physical and/or logical devices upon which storage is allocated, provide vendor-specific attributes or settings, indicate a number and type of file created, and the like. In connection with the type of file created, this may be particular to the email application. A file may be a database or a log file. The log files are used to keep a record of transactions taking place and may be used in connection with recovery operations. The database files hold mailbox stores such as email data. In connection with the user communicating with the level 1 service provider, such detail is not provided and defaults may be specified by the data storage system when implementing the level 1 data storage configuration request. The defaults may be customized for the particular application.

When implementing the request, the level 1 service provider may communicate with one or more other level service providers such as 104b and 104c. Different defaults for the particular application may be used by service providers 104b and 104c. For example with reference to the level 1 request for the email application described above, the level 1 service provider 104a may communicate with the level 2 service provider 104b. Provider 104b may then communicate with the level 3 service provider 104c to implement the request and allocate the requested storage along with specifying other defaults such as, for example, a default level of data protection. The service provider 104c may communicate with other data storage system hardware and/or software when implementing the configuration request.

As illustrated in the example 100, a service provider at a level n may generally communicate, directly or indirectly, with one or more other service providers at levels lower than level n when processing a data storage configuration request. A user may select the level of interaction and the user's data configuration request is received at the data storage system by the UI 102. The UI 102 in turn communicates with the appropriate level service provider to initiate the request. Furthermore, a request received at a first level can result in multiple requests to a lower level to perform an operation. For example, a user may connect to the data storage system 12 at level 1 104a. In response, the level 1 service provider 104a may issue more than one request to provider 104b. In turn, each request to provider 104b may result in one or more requests to provider 104c which, in turn, communicates with adapters and other code modules to perform the requested operation.

Figure 3:
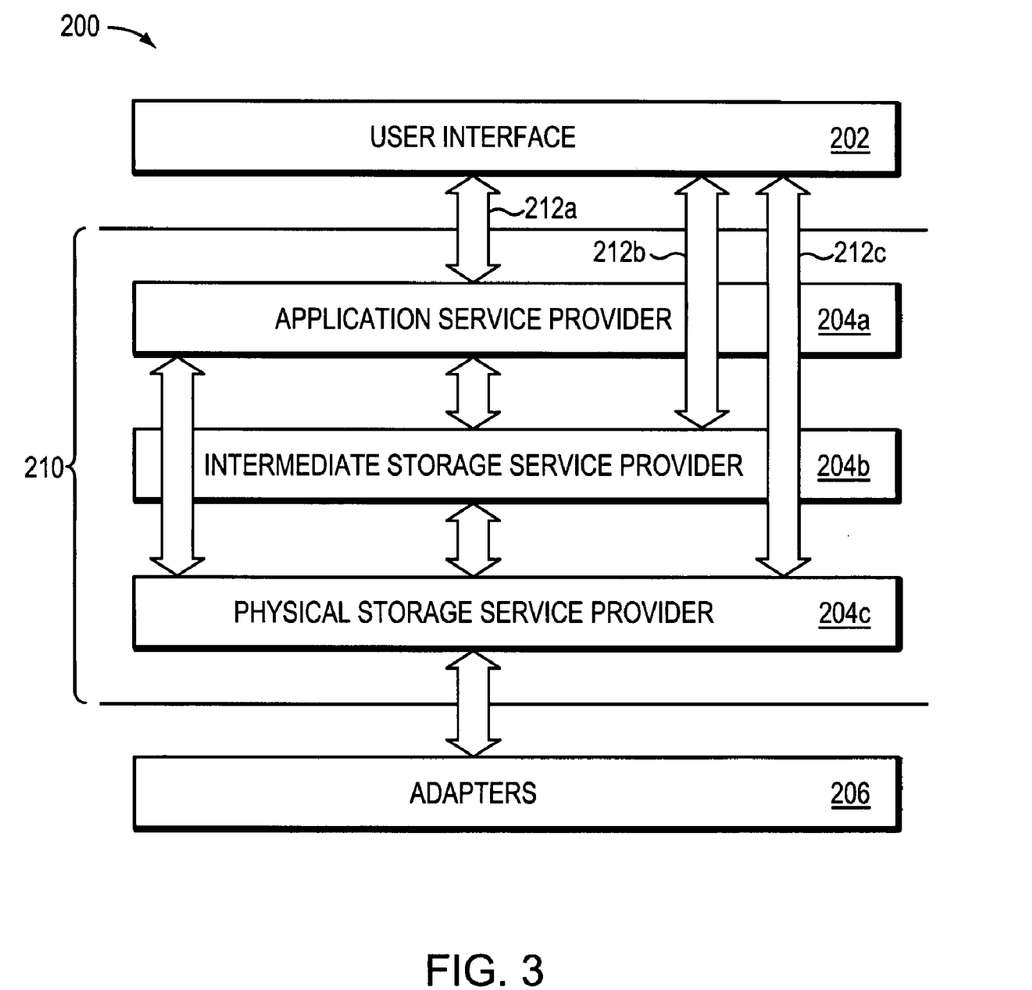

Referring to FIG. 3, shown is another example representation of components that may be included on the data storage system 12 for use in performing the techniques herein for data storage configuration. The example 200 is a more detailed illustration setting forth a particular instance of the different service providers and levels that may be included in an embodiment. Elements 202 and 206 are similar, respectively, to elements 102 and 106. Element 210 includes 3 service providers: application service provider 204a, intermediate or generic storage service provider 204b and physical storage service provider 204c. With respect to a level hierarchy, 204a may correspond to level 1 service provider 104a of FIG. 2, 204b may correspond to level 2 service provider 104b of FIG. 2, and 204c may correspond to level 3 service provider 104c of FIG. 2.

The application service provider 204a may have an application-specific focus and provide a level of abstraction customized for an application such as, for example, a particular email application, law office application or medical office application, as well as a class of related applications, such as a multiple email applications. When interacting with provider 204a for a particular application, the interface language may vary with the application. For example, if the application is a law office application, the interface language, menu options, and the like, may be tailored to the law profession. Similarly, a medical office application may utilize an interface language, menu options, and the like, familiar to the medical office.

The intermediate storage service provider 204b may be an intermediate or second level of user interaction. As illustrated, the provider 204a may communicate with 204b when implementing a request for data storage configuration. In one embodiment, a user connecting to provider 204b may be provided with a generic level of interaction which may not be tailored for the particular application. In other words, the same language and user interface may be presented to a user for multiple applications such as the medical application or law office application. As a variation to the foregoing, the service provider 204b may be customized for each application and provide for a more detailed level of exposure that varies per application.

The physical storage service provider 204c provides the most detailed or greatest level of exposure of the underlying data storage system. The provider 204c may be customized for the particular storage vendor and associated options. The user interface for a user connected at level 3 to service provider 204c may include menu options and terms particular to the underlying storage vendor and the more knowledgeable user. For example, the user may specify particular devices, RAID levels and techniques, file types, SCSI and iSCSI terminology, and the like.

Figure 4:
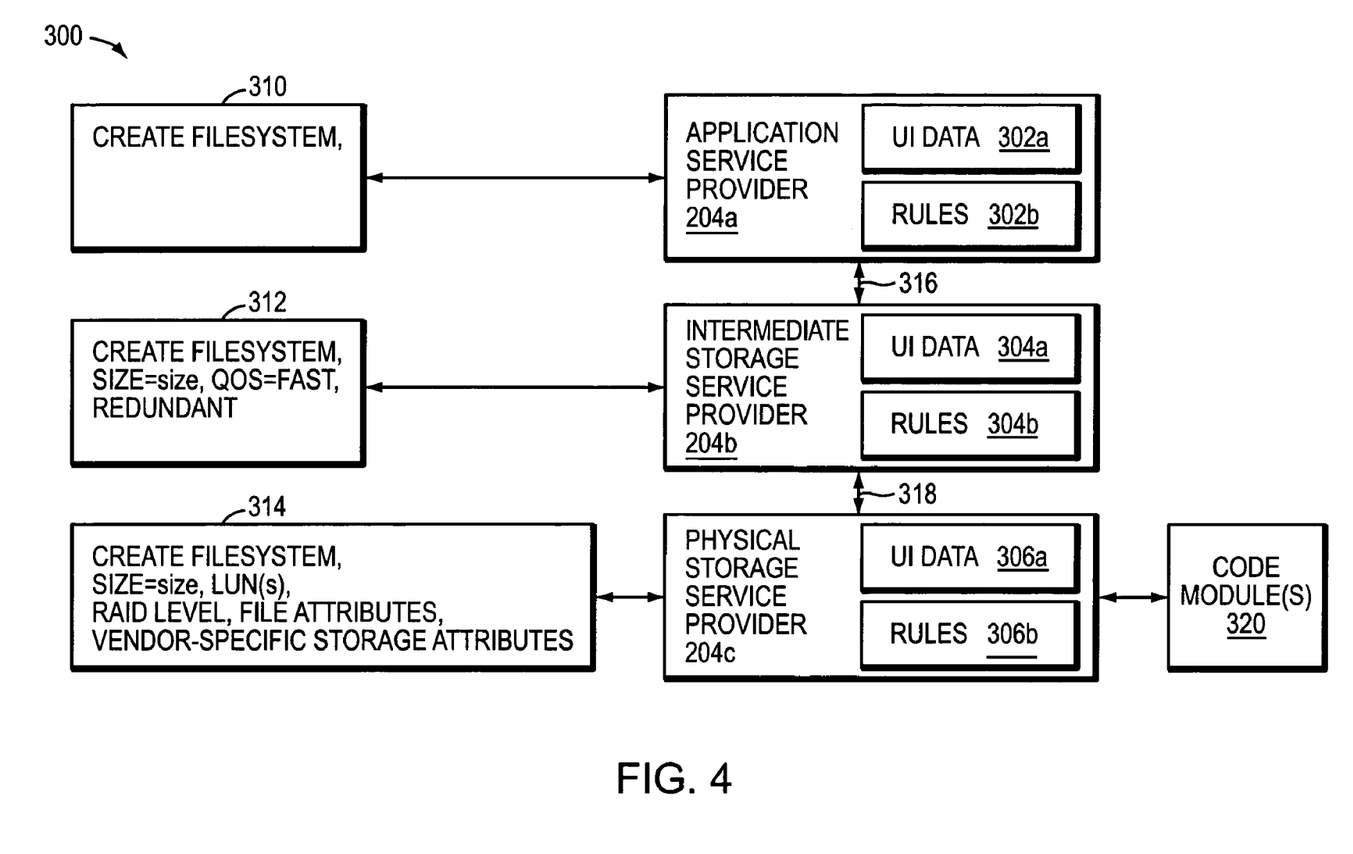
FIG. 4 is an example illustrating the mapping between different service provider layers or user levels.

Referring to FIG. 4, shown is an example illustrating how the different service providers of FIG. 3 may be used to perform the mapping between levels to perform a data configuration request, and also provide different levels of user interaction.

Elements 204a, 204b, and 204c correspond to the different levels of service providers described in connection with FIG. 3. Elements 310, 312 and 314 represent the information obtained via the UI at the various levels and service providers. Element 310 represents the information obtained for a user connected at level 1 to service provider 204a. Element 312 represents the information obtained for a user connected at level 2 to service provider 204b. Element 314 represents the information obtained for a user connected at level 3 to service provider 204c. Information obtained by a user at level n may be subsequently passed on via an API call to one or more other lower level (e.g. greater than n) service providers in order to perform the user request.

Element 312 may also represent the information communicated by the service provider 204a after the provider 204a applies mapping rules 302b to 310 resulting in an API call of the form as illustrated in 312. Element 314 may represent the information communicated by the service provider 204b after the service provider 204b applies mapping rules 304b to 312 resulting in an API call of the form as in 314

With reference to the example 300, if a user interacts with the system at level 1, the application service provider 204a obtains the data included in 310 which is passed on in form 312 to provider 204b as illustrated by 316. Provider 204b in turn maps data from form 312 to the form of 314 to provider 204c as illustrated by 318. If a user interacts with the system at level 2, the intermediate service provider 204b obtains the data included in 312 and passes the data of 312 to provider 204c in the form represented in 314. If a user interacts with the system at level 3, the physical storage service provider 204c obtains the data from the UI in the form 314. In this example, the provider 204c may implement or execute the one or more operations to perform the request indicated by 314 by invoking one or more other code modules 320. The code modules 320 may communicate with other components on the data storage system to perform the requested task.

In one embodiment, the UI 202 of FIG. 3 may query each service provider to obtain the appropriate UI data 302a, 304a and 306a via API calls in accordance with a user selected level of interaction using any one of a variety of different techniques as described herein and known to those skilled in the art. The UI data 302a, 304a and 306a may be used to populate the menus and other UI elements that may be displayed to a user.

As will be appreciated by those skilled in the art, the examples, such as those of FIG. 4 and following, may be simplistic for purposes of illustration of the features. At lower levels, there may be greater amounts of detail and complexity in order to provide automation of the best practices.

The beginner or most simplistic view (level 1) of the data storage system and tasks performed for data storage configuration noted above abstracts away details of storage concepts such as RAID types, stripe sizes, and disk counts. However, even at the most simplistic view non-storage-savvy users can seek and require guidance and information.

With respect to FIG. 5, in an illustrative example also referenced below, a level 1 non-savvy user attempting to provision the system for a database application is unsuccessful since all disks are already allocated to an email application. Absent online help that has been enhanced by use of the technique described herein, in such a case the user may receive an indication that the system has no disks available for such provisioning, and thus may invoke online user assistance and may navigate to a disk status page to check on available capacity. Upon discovering that there is still plenty of storage space available, the user may become confused and frustrated since the user does not understand that, in the user's particular case at least, storage allocated for the email application cannot or should not be allocated for the database application even if the storage is not full of email data. Absent online help that has been enhanced by use of the technique described herein, such a user is likely to require expensive human help as the next step.

Since the user is operating at level 1, the user has probably not understood the following: by requesting provisioning for the database application, the user initiated the following set of lower level actions which ultimately returned failure for the request. In one lower level action, it is determined that a request has been issued to allocate 10 GB of "fast" storage, and a request is made to allocate 10 GB of particular RAID (e.g., RAID1) storage. This leads to a request to find 10 GB free storage of the particular RAID type, which fails because all disks have been allocated under another RAID type (e.g., RAID5) for the email application.

Figure 6:
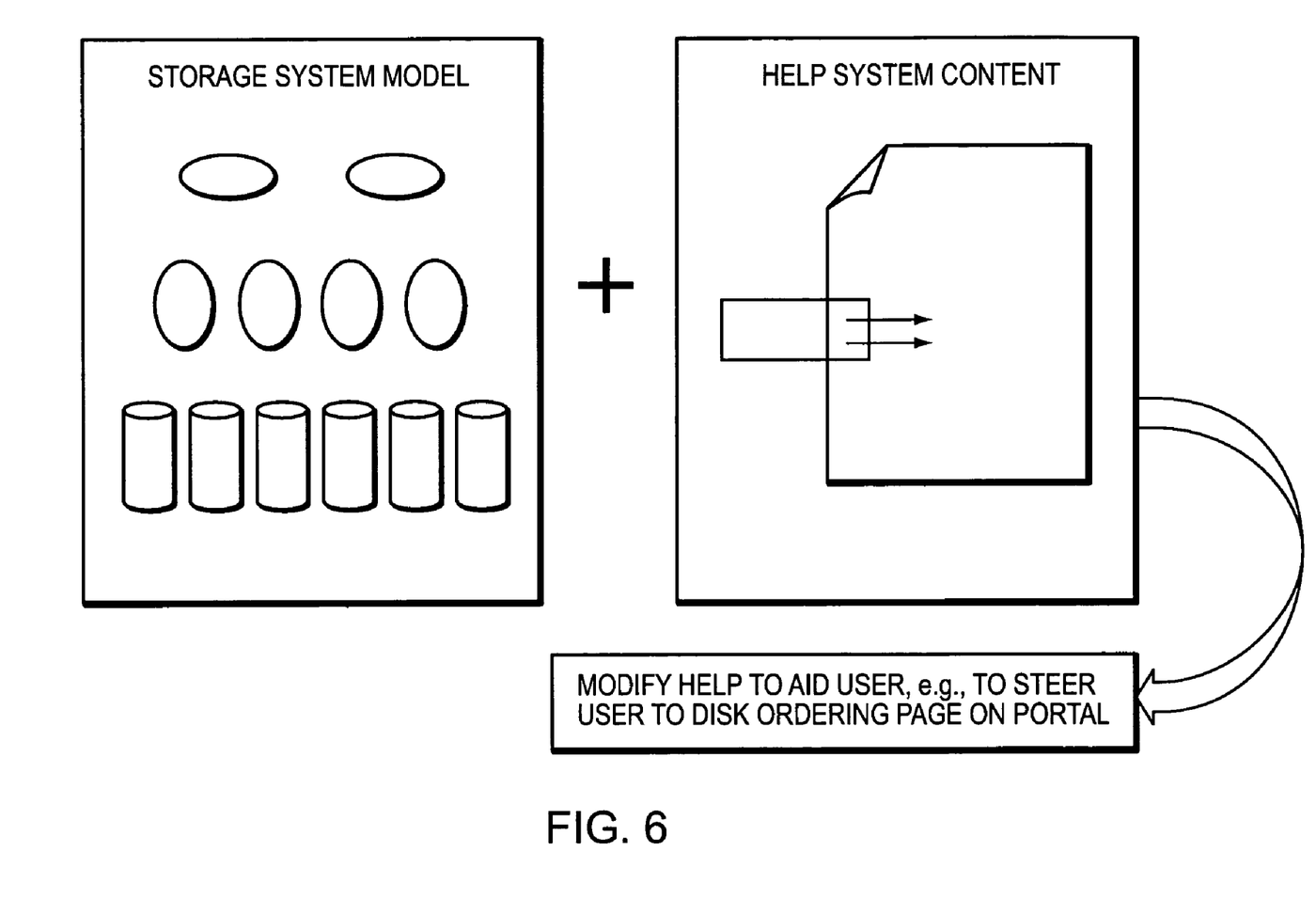

With reference to FIG. 6 and as described in more detail below, in at least one implementation, a storage system model is used by the technique in an analysis that also uses a log. The storage system model depicted in FIG. 6 represents the current configuration of the storage system, and can include, for example, the number of disks, LUNs, RAID types, cache configuration, and host connections. In an application aware storage system additional information can be represented by the model, including the applications that are using the storage (e.g., Microsoft Exchange, Oracle database), and the disks and/or LUNs that are currently storing the data for those applications. The storage system model can be implemented in one or more a number of different ways, including an in-memory data structure, a disk-resident database, or a flat XML file. The storage system model, when combined with the log information, allows for a near complete, in-depth analysis of user actions.

The system's online user assistance ("help system" or "help") provides the answer notifying the user of the lack of allocatable space for the database application, but in the absence of the technique, it cannot be determined:

1) When and why the user tried to use help
2) What the user looked at when the user used help
3) What the user tried to do after reading help Preferably, after use of the technique, the help system has recognized from the model and user interface and help log what the user is trying to do and prompts the user with possible user action which in the example includes ordering more disks for the system (e.g., via an ecommerce portal).

As described below, use of the technique is also helpful during pre-roll-out to help build up patterns improving the help system's ability to aid the user. In particular, given a recognizable pre-help pattern of steps taken by the user, the help system can automatically provide the user with appropriate help screens or automatically prompt the user for the proper action to take, and potentially eliminate the need for searching through help. Also, given an incorrect post-help pattern, the help system can provide notification that the help system needs improvement. In at least some implementations, built up patterns can be updated automatically to or on the system.

An analysis tool implementation all or a portion of the technique may be provided on board the system and/or external to the system. The model and the log may be uploaded to a remote server, with the resulting analysis being fed into product improvement planning. For example, based on the data, the system may be changed so that users are not allowed to use the system in the way that led to the problem; in the specific example, user interface screens may be changed so that if the email application uses up all of the disks, a selection for provisioning another application (e.g., the database application) is grayed out, i.e., made inaccessible.

Thus, the technique helps provide significant capability to analyze and link user behavior to help usage in at least the lower end of the market, and implement a feedback loop to improve usability and customer acceptance. Analyzing pre- and post-help behavior allows use of predictive techniques to tailor help for the user's specific problem.

In an example data storage system having hardware and software components as described above, the technique may be implemented in the software architecture. Particularly in the case in which the data storage system is an inexpensive product intended for simple set up, the technique not only aids ease of use but also understanding of where the user is in the sequence of installation and use. The technique thereby helps show how the user might have a problem, why the user might go to help, and what to do about it.

An initial benefit is that the user is provided with more effective help, but a longer term benefit is improved understanding about what in the user interface did not seem obvious or intuitive to the user. In particular, the technique helps elucidate how the user accessed help, what in help did the user find or not find, and reports that back so that the system's behavior can be modified automatically or manually. For example, if the user is not having success with file systems, the system's behavior can be improved to make creating file systems more intuitive or obvious. Implementations of improvements can be automated or performed manually as revisions to the system's software, optionally by a value added reseller (VAR), depending on the situation. Tracking user activities, the help the user exercises, and what the user does afterwards allows detection of user difficulties such as going to the wrong page, and in at least some cases allows changing help dynamically (e.g., where help includes a wild type of environment).

A level 1 user is abstracted away from many storage system concepts and details, but still can have problems as shown by example above with respect to provisioning the system for a database application in the absence of benefit of the technique. In a particular version of the example, the user is informed by the user interface that there are no available disks, invokes the help system, searches for help on disks, reaches a help screen describing how to use the user interface to check storage capacity, exits the help system and so uses the user interface, and is informed that storage space is in fact available. As noted above, the underlying reason for the user's failure is that the disks have been fully allocated (e.g., for two groups for the email application) under a RAID type not suitable for the database application.

In accordance with the technique, all system actions occurring in the example are logged, including all actions occurring deeper in the software than that revealed to the level 1 user, as the provisioning attempt, help invocation, and capacity check cause message and data flows within the system.

In general, the technique allows derivation of a user beneficial result from the model and the log, which result in the example is a suggestion for ordering more disks. Thus the technique relies on, at least for logging purposes, a merger of user interface behavior and help system behavior, since, without such merger, it cannot be determined why and when the user tried to use help, what the user looked at, and what they did (their path or transaction through help system). Without the technique, in the example it is possible to determine the state of the system and why the provisioning attempt was disallowed, but not what the user tried to do in between initiating the attempt and learning of disallowance, or after disallowance.

Thus the technique relies on a path for linking the user interface environment and help environment. By the log it can be determined that the user invoked help and did a search. The log also indicates the help screens the user looked at and when, and what the user did afterward. Thus it can be determined whether the user took the right road or the wrong road afterward, and ultimately how effective the help was.

With reference to the provisioning example, it is highly beneficial even if the help system is simply improved to provide an explanation that all of the disks have been allocated and configured specifically for high performance by the email application and that the database application would perform poorly if it relies on such already allocated disks. The level 1 user is not expected to understand the storage concept of allocation versus actual use, but such an explanation can help avoid expensive human intervention. This is made possible under the technique because a pattern of usage is recognized before or when the user invokes help. The model combined with pattern recognition using logging or tracking can help identify the situation to an acceptable level of probability and enable effective help.

Figure 7:
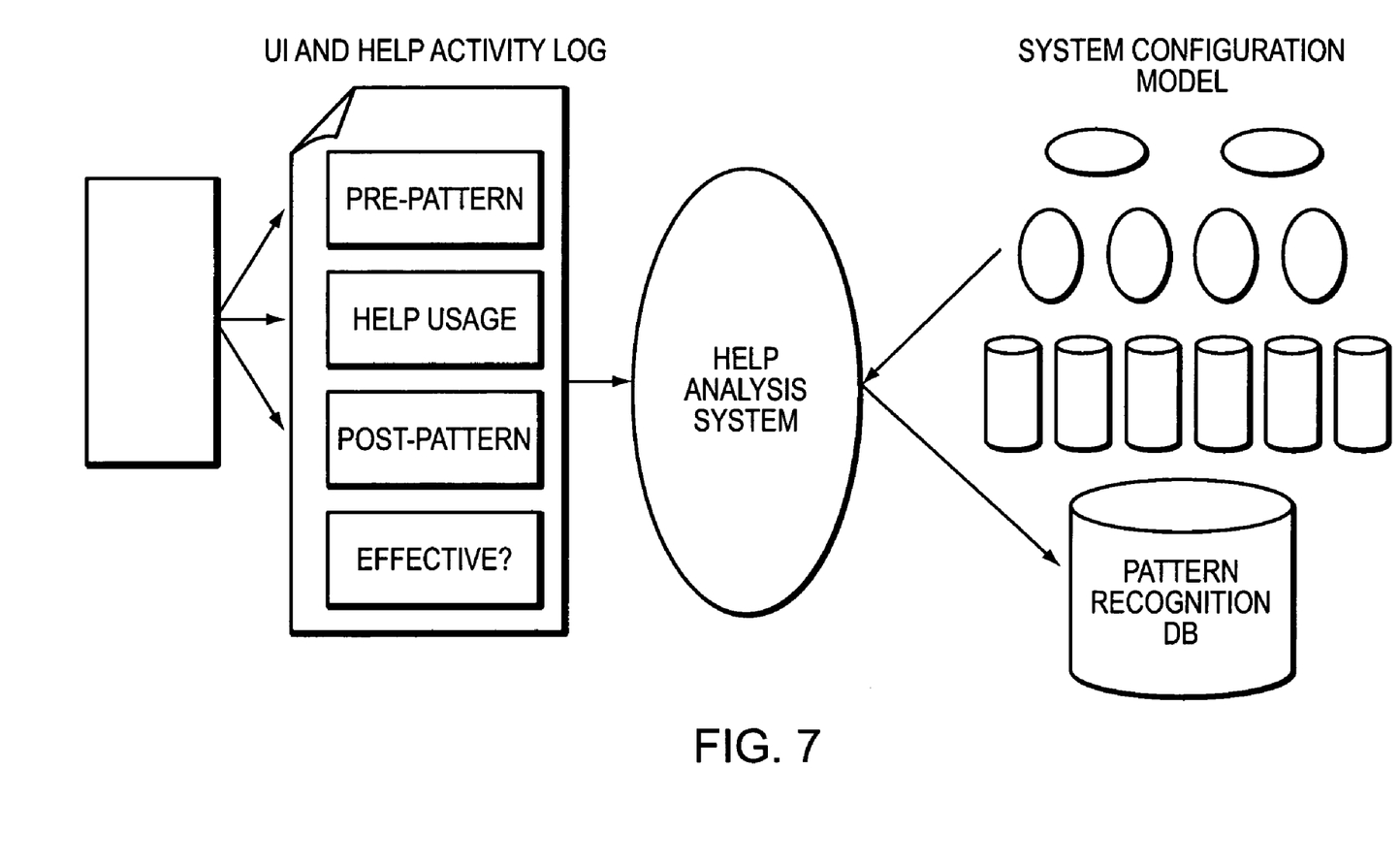
FIG. 7 is a block diagram of data flow for use with the system of FIG. 1.

With reference to FIG. 7, the log may be uploaded along with other logs to enable remote analysis, by a tool as described above. In at least some implementations, such analysis may take into account one or more of the following: a log pattern before help is invoked ("prepattern"), another log pattern within the help system, and a further log pattern subsequent to use of the help system ("postpattern").

With respect to the database application provisioning example described above, the tool may be executed taking into account the model and the prepattern, to help generate content for a pattern recognition database such that whenever the pattern is encountered, a specified context of help is provided. The content and/or context may be supplied to the storage system or generated dynamically. If the tool is executed repeatedly, e.g., in the storage system, the help system can grow more and more effective, such that, for example, when the user clicks on help, the user's previous actions (e.g., 5 significant actions) can be checked against the pattern recognition database and highly effective help can be provided. Thus, the first time a problem occurs, depending on how the pattern recognition database is populated, the prepattern may not allow derivation of such help, so the user may be led down the wrong path until the pattern recognition database is updated. In general, the analysis improves over time with more statistical basis and data.

The model is also useful because, in at least some cases, on its own the prepattern does not supply enough information to allow effective results—the analysis needs to take into account how the system is configured. Thus in at least one implementation the model describes details such as the number of disks, configurations for applications such as email, the amount of memory, and error data such as disks giving soft errors. In effect the model includes a dump of the system configuration.

The model may be collected in one or more ways. The storage system may include a command line command (e.g., a dump all command) that reports, among other things, how many file systems, how many disks, and how many users are configured in the system. In an industry standard way, a common information model may be relied upon that is derived by issuing, e.g., over a network portal, an enumerate all instances command to identify all objects in the system. In general, the model may rely on industry standard and/or product specific functionality.

With respect to the log, in a specific implementation, at the user interface level, the user clicks on provision database application and the request goes into the storage system where a piece of software logs all action including the click, recording in a trace file or log file. The request causes another layer of software to attempt to allocate 10 GB of fast storage, which action is also logged. The log may be, include, or be included in a file on disk, a memory buffer, or a report to the user. In at least some cases, the log is active and recording at all time while the storage systems is running, and may also be used to allow for rollback operations.

Figure 8:
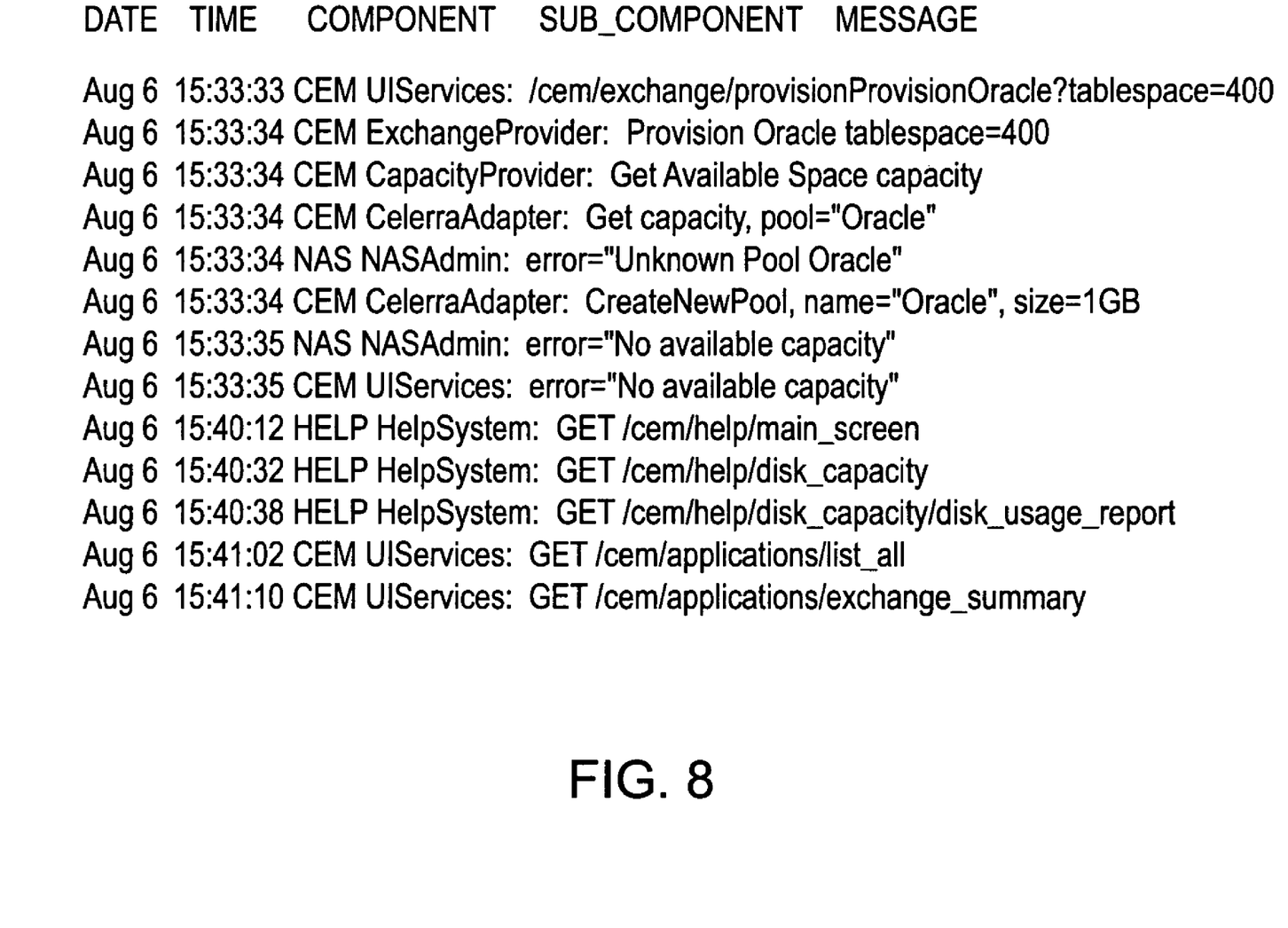
FIG. 8 is an illustration of sample tracking data for use with the system of FIG. 1.

FIG. 8 illustrates a sample of log entries, where the database application is identified as Oracle. This type of log entry may be commonly found in a UNIX system, and contains a date field indicating the day the entry occurred, a time field indicating the time, a component field which indicates the component and potentially sub-component in the architecture that is logging the information (e.g., the help system), and the message that is being logged. The log in FIG. 8 depicts an example in which the user is trying to configure an Oracle database but there are not enough disks because existing disks have already been allocated for use by an email application.

Figure 5:
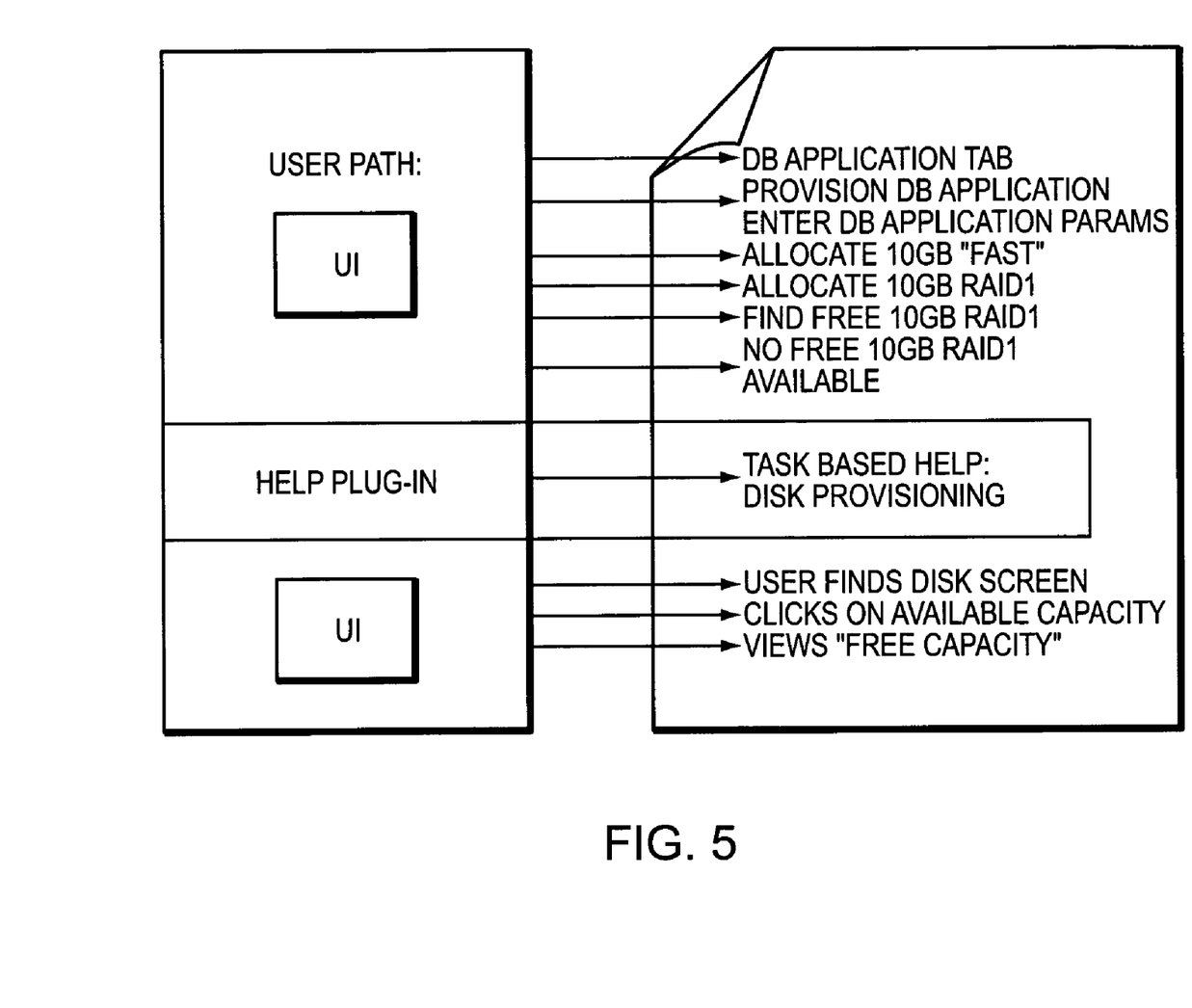
FIGS. 5-6 are illustrations of procedures for use with the system of FIG. 1.

Free form text in the example of FIGS. 5 and 8 can be converted to XML for easier processing by an analysis system. In a specific example of the analysis system, the log for FIG. 5 includes a prepattern that may be expressed in xml, such that the first tag of xml indicates "provision database application", wherein parameter 1 specifies capacity ("10 GB") and parameter 2 specifies speed or quality of service ("fast"). Further xml tags show actions taken for the deeper software layers and for invoking help. Thus the xml tags (e.g., 4 xml tags) are checked against the pattern recognition database along with the model, in combination, which may lead to launch of a specific help screen. The log may identify user interface locations by page hits, e.g., down to a bookmark level of a location within a page.

Thus, for example, the analysis uses state information in the form of the prepattern, and a model showing that there are, e.g., six disks and two email application groups, or simply that the email application is present. With this content in the pattern recognition database, and with respect to the provisioning attempt example above, the next time a user executes correlating with the prepattern and then clicks help, use of the pattern recognition database identifies the pattern of xml tags, and examination of the model reveals that the user is already provisioned for the email application. In such a case, the user cannot succeed because the email application is claiming all the storage, and therefore context sensitive help is launched that explains that provisioning cannot be accomplished for the database application, with a description of the reason, and a suggestion for how the situation can be improved.

In at least some specific implementations, the pattern recognition operation occurs when the user next invokes help, and the pattern recognition database is preloaded with patterns based on historical data from the user and/or other users. In particular, the pattern recognition database may be built by running the system before multiple (e.g., thousands of) users during a prerollout phase, and then continuously updated.

With respect to matching patterns, depending on the implementation, a 100% match may not be necessary, and known correlation techniques may be applied and/or adjusted for performance.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in tracking use of interface and online assistance, the method comprising:
   tracking a first set of a user's user interface activity;
   tracking the user's online assistance activity subsequent to the user's user interface activity;
   tracking a second set of the user's user interface activity, the second set occurring subsequent to the user's online assistance activity; and
   recording together a description of the first and second sets of the user's user interface activity and the user's online assistance activity, wherein the description describes data storage system setup activity of the user.

2. The method of claim 1, further comprising:
   recording the user's time expended together with the description.

3. The method of claim 1, wherein the description describes when and why the user tried to use online assistance.

4. The method of claim 1, wherein the description describes what the user looked at when the user used online assistance.

5. The method of claim 1, wherein the description describes what the user tried to do after using online assistance.

6. The method of claim 1, further comprising:
   building up usage patterns during pre-roll-out of a product.

7. The method of claim 1, further comprising:
   building up usage patterns automatically.

8. The method of claim 1, further comprising:
   uploading the description to a remote server.

9. The method of claim 1, wherein the description indicates help screens the user looked at.

10. The method of claim 1, further comprising:
    using the description as content for a pattern recognition database.

11. The method of claim 1, further comprising:
    including in the description all action including the user's use of an input device.

12. The method of claim 1, further comprising:
    recording the description at all time while a storage system is running.

13. The method of claim 1, further comprising:
    using the description in preloading a pattern recognition database with patterns based on historical data.

14. A method for use in tracking use of interface and online assistance, the method comprising:
    tracking a first set of a user's user interface activity;
    tracking the user's online assistance activity subsequent to the user's user interface activity;
    tracking a second set of the user's user interface activity, the second set occurring subsequent to the user's online assistance activity; and
    recording together a description of the first and second sets of the user's user interface activity and the user's online assistance activity, wherein the description is suitable for use with a storage system model.

15. A method for use in tracking use of interface and online assistance, the method comprising:
    tracking a first set of a user's user interface activity;
    tracking the user's online assistance activity subsequent to the user's user interface activity;
    tracking a second set of the user's user interface activity, the second set occurring subsequent to the user's online assistance activity;
    recording together a description of the first and second sets of the user's user interface activity and the user's online assistance activity; and
    using the description to show where the user is in a sequence of installation and use.

16. A method for use in tracking use of interface and online assistance, the method comprising:
    tracking a first set of a user's user interface activity;
    tracking the user's online assistance activity subsequent to the user's user interface activity;
    tracking a second set of the user's user interface activity, the second set occurring subsequent to the user's online assistance activity; and
    recording together a description of the first and second sets of the user's user interface activity, the user's online assistance activity, and actions occurring deeper in software than that revealed to the user.

17. A method for use in tracking use of interface and online assistance, the method comprising:
- tracking a first set of a user's user interface activity;
- tracking the user's online assistance activity subsequent to the user's user interface activity;
- tracking a second set of the user's user interface activity, the second set occurring subsequent to the user's online assistance activity; and
- recording together a description of the first and second sets of the user's user interface activity and the user's online assistance activity, wherein the description includes a first log pattern before online assistance is invoked, a second log pattern within online assistance, and a third log pattern subsequent to use of online assistance.

18. A method for use in tracking use of interface and online assistance, the method comprising:
- tracking a first set of a user's user interface activity;
- tracking the user's online assistance activity subsequent to the user's user interface activity;
- tracking a second set of the user's user interface activity, the second set occurring subsequent to the user's online assistance activity; and
- recording together a description of the first and second sets of the user's user interface activity and the user's online assistance activity, wherein the description comprises
  - a date field indicating the day a description entry occurred;
  - a time field indicating the time;
  - a component field which indicates a component in a software architecture that is providing information for the entry; and
  - a message being described.

* * * * *